United States Patent [19]

Harvey et al.

[11] 3,927,202

[45] Dec. 16, 1975

[54] DENTIFRICES

[75] Inventors: Kenneth Harvey, Prestwich; Sydney Lee, Worsley, both of England

[73] Assignee: Colgate-Palmolive Company, New York, N.Y.

[22] Filed: Jan. 23, 1974

[21] Appl. No.: 435,899

[30] Foreign Application Priority Data
Jan. 29, 1973   United Kingdom................ 4338/73

[52] U.S. Cl.................................... 424/57; 424/49
[51] Int. Cl.$^2$........................................... A61K 7/16
[58] Field of Search................................ 424/49–57

[56] References Cited
UNITED STATES PATENTS

| | | | |
|---|---|---|---|
| 2,019,142 | 10/1935 | Kuever................................ | 424/57 |
| 2,191,199 | 2/1940 | Hall.................................... | 424/57 X |
| 3,227,617 | 1/1966 | Manahan et al..................... | 424/52 |
| 3,269,814 | 8/1966 | Netherton et al.................. | 424/57 X |
| 3,562,385 | 2/1971 | Block et al......................... | 424/54 |
| 3,574,823 | 4/1971 | Roberts et al. ................... | 424/49 |
| 3,711,604 | 1/1973 | Colodney et al.................... | 424/52 |
| 3,803,301 | 4/1974 | Cordon et al....................... | 424/49 |
| 3,840,657 | 10/1974 | Norfleet.............................. | 424/49 |
| 3,842,167 | 10/1974 | Block et al.......................... | 424/49 |

*Primary Examiner*—Shep K. Rose
*Attorney, Agent, or Firm*—Robert L. Stone; Herbert S. Sylvester; Murray M. Grill

[57] ABSTRACT

Dentifrice comprising an alkali metal phosphate salt polishing agent which has a refractive index between about 1.435 and about 1.465. The polishing agent is homogeneously distributed in a dentifrice gel vehicle which comprises a liquid phase including humectant, 0 up to an amount of free water which dissolves about 30% by weight of said polishing agent at 40°C. and a gelling agent. The refractive index of the gel vehicle is between about 1.36 and about 1.47. The dentifrice is typically a visually clear gel.

8 Claims, No Drawings

DENTIFRICES

This invention relates to a dentifrice. In particular, it relates to a dentifrice which may be visually clear in which a polishing agent can be employed which is more water-soluble than polishing agents which have been conventionally used in commercial dentifrices in the past. Such polishing agents can be incorporated into gel vehicle of dentifrices which have refractive indices which cover a broader span compared to that which has been possible in the past with vehicles of clear gel dentifrices which include polishing agents.

Visually clear gel dentifrices are very appealing to consumers. Recently, polishing agents have been incorporated into such clear gel detifrices dentifrices order to provide desirable cleaning effects. However, until now, it has been necessary to carefully adjust proportions of the components in order to provide a refractive index which is very close to that of particular substantially water-insoluble polishing agents which provide desirable dentifrice effects. Substantial departure from the refractive index of these polishing agents produce substantial unclarity and even opaqueness to the dentifrice. This has limited the choice of vehicle formulations and of polishing agents.

It has now been found that certain water-soluble as well as water-insoluble phosphate salt polishing agents, which have not been in general use in dentifrices in the past, can be employed in dentifrices in which the refractive index of the gel vehicle of the dentifrice can be adjusted over a particular range in order to provide clarity to the dentifrice, if desired.

It is an advantage of this invention that relatively soluble polishing agents are employed in dentifrices having a gel vehicle, the refractive index of which can vary over a wide range. Other advantages of this invention will be apparent from consideration of the following disclosure.

In accordance with certain of its aspects, this invention relates to a dentifrice, comprising up to about 50% by weight of a dentally acceptable water-soluble or water-insoluble alkali metal phosphate salt polishing agent having a refractive index between 1.435 and about 1.465 and a dentifrice gel vehicle comprising (1) at least about 20% by weight of said dentifrice of a liquid phase including humectant and O up to amount of free water in which not more than 30% by weight of said polishing agent is soluble at 40°C. and (2) about 0.5–10% by weight of a gelling agnet, the refractive index of said dentifrice gel vehicle being between about 1.36 and 1.47 when said phosphate salt is water-soluble and between about 1.458 and about 1.463 when said phosphate salt is water-insoluble, said phosphate salt being homogeneously and invisibly distributed in said dentifrice gel vehicle. Preferably the dentifrice is visually clear.

Alkali metal phosphate salt polishing agents which are useful in the practice of the instant invention are characterized by having a refractive index between about 1.435 and 1.465. They typically comprise up to about 50% by weight, preferably about 5–50% and most preferably about 10–30% of the dentifrice. These include the water-insoluble salt, potassium metaphosphate, as well as the relatively more soluble pyro-and orthophosphate hydrates, sodium pyrophosphate decahydrate, dibasic sodium orthophosphate di-, hepta- and dodecahydrates and tribasic sodium orthophosphate dodecahydrate. These polishing agents can be desirably homogeneously and invisibly dispersed in a dentifrice gel vehicle, the refractive index of which can vary over a range and still remain visually clear, that is translucent and even transparent. The particles of polishing agents are macroscopically invisible in the dentifrice and are typically below about 74 microns in size and often below about 10 microns in size. The term "water-soluble" when applied to phosphate polishing agents herein indicates that they are at least a few percent, such as at least about 4%, soluble in water at room temperature. Such salts are generally almost twice or more soluble in water at about 40°C.

The alkali metal phosphates in the Table below with the exception of potassium metaphosphate are significantly water soluble. Therefore, if water is employed in the gel vehicle, the amount present which is free to dissolve the polishing agent should be no more than that which would dissolve about 30% by weight of the polishing agent at 40°C. It is noteworthy that some water which may be present in a dentifrice would not be free to solubilize the polishing agent. For instance, only a small portion of water in a 70% solution or in a solution of sodium N-lauroyl sarcosinate, which may contain 2% of the sarocosinate, 2.9% glycerine and 4.6% water is free to partially solubilize the polishing agent.

Water has a refractive index of 1.33, which is lower than other liquid components typically employed in a dentifrice gel vehicle. Therefore, its presence tends to lower the refractive index of the gel vehicle. This accounts for the "desirable" minimum refractive index values of polishing agents 2–6 in the Table. Lower refractive indices to about 1.36 remain clear in the presence of polishing agents 2–6; although if water is employed to achieve such refractive indices below that "desirable" range, an undue amount of polishing agent may dissolve. The water and other liquid contents of the gel vehicle are discussed in more detail below.

In the following table polishing agents of the invention are indicated, together with their water-solubilities at room temperature and at 40°C., their refractive indices and the refractive index ranges of gel vehicles in which they are visually clearest and not overly solubilized (that is, more than about 30% solubilized at 40°C.).

TABLE

| POLISHING AGENT | PARTS SOLUBLE PER 100 PARTS OF $H_2O$ | | REFRACTIVE INDEX OF POLISHING AGENT | DESIRABLE REFRACTIVE INDEX RANGE OF GEL VEHICLE |
|---|---|---|---|---|
| | ROOM TEMP. | 40°C. | | |
| Potassium Metaphosphate ($KPO_3$) | 1.1 | 1.1 | 1.458 | 1.458–1.463 |
| Sodium Pyrophosphate | | | | |

TABLE-continued

| POLISHING AGENT | PARTS SOLUBLE PER 100 PARTS OF $H_2O$ ROOM TEMP. | PARTS SOLUBLE PER 100 PARTS OF $H_2O$ 40°C. | REFRACTIVE INDEX OF POLISHING AGENT | DESIRABLE REFRACTIVE INDEX RANGE OF GEL VEHICLE |
|---|---|---|---|---|
| Dodecahydrate ($Na_4P_2O_7.10H_2O$) | 6.2 | 11.5 | 1.450 | 1.370–1.470 |
| Dibasic Sodium Orthophosphate Dihydrate ($Na_2HPO_4.2H_2O$) | 5 | 40 | 1.463 | 1.444–1.470 |
| Dibasic Sodium Orthophosphate Heptahydrate ($Na_2HPO_4.7H_2O$) | 5 | 50 | 1.436 | 1.444–1.470 |
| Dibasic sodium Orthophosphate Dodecahydrate ($Na_2HPO_4.12H_2O$) | 4 | 43 | 1.436 | 1.444–1.470 |
| Tribasic sodium Orthophosphate Dodecahydrate ($Na_3PO_4.12H_2O$) | 20 | 70 | 1.446 | 1.458–1.470 |

The refractive index ranges of gel vehicles in the table above particularly for polishing agents 2–6 may be broadened to about 1.360 to about 1.472. When this is done, the amount of water to be employed in the gel vehicle should be controlled since its presence dissolves a portion of the polishing agents.

The gel or liquid vehicle of the dentifrice preferably forms a mass of a consistency which desirably can be extruded from a collapsible tube, such as an aluminum, a lead of a plastic tube.

The vehicle contains liquid and solids. The liquid portion comprises at least about 20% and typically 20–94.5% by weight of the dentifrice and includes humectant and may include water. if present, water or at least water which is free to dissolve the polishing agent, should preferably be present in no greater amount than would dissolve about 30% by weight of the polishing agent at 40°C. or reduce the desired clarity of the finished dentifrice. Thus, substantial amounts of free water may be employed, while desirably keeping the refractive index of the gel vehicle between about 1.458 and 1.463 when the polishing agent is the only substantially insoluble potassium metaphosphate. The dentifrice may contain as much as about 50% of free water when the polishing agent is sodium pyrophosphate dodecahydrate without dissolving more than about 30% of that salt at 40°C. The hydrated dibasic sodium orthophosphate and tribasic sodium orthophosphate dodecahydrate are more water-soluble and preferably lesser amounts of free water are employed when they are present. About 12–15% by weight of free water in the dentifrice would dissolve about 30% of the dibasic salts at 40°C. and about 8.4% of free water in the dentifrice would dissolve about that amount of the tribasic salt. The refractive index of water is 1.33 and thus it may be employed, if desired and insofar as it is tolerated, to lower the refractive index of the gel vehicle since commonly employed humectants may comprise a large portion of the gel vehicle and they generally have refractive indices of about 1.44 to 1.47. The refractive index of sorbitol as a 70% solution in water is 1.45 and the refractive index of glycerine is 1.47. The refractive index of the gel vehicle corresponds approximately to the average refractive index of water and humectant in the vehicle, if the vehicle contains no opacifying component. In other words, a vehicle containing equal weight amounts of glycerine (refractive index = 1.47) and water (refractive index = 1.33) would have a refractive index of about 1.40.

Water may also be employed if it is desired to thin the gel. When present, free water generally does not exceed about 15% by weight of the dentifrice and is generally substantially less.

Either sorbitol (70% aqueous solution) or glycerol, or a mixture of both may constitute up to 80% by weight of the dentifrice. Other humectants such as low average molecular weight polyethylene glycols (e.g., an average molecular weight of about 400) and propylene glycol are also desirable as at least part of the humectant.

The solid portion of the vehicle is a gelling agent, such as the natural and synthetic gums and gum-like materials, such as Irish moss, gum tragacanth, alkali metal carboxymethyl cellulose and hydroxymethyl carboxyethyl cellulose, polyvinyl pyrrolidone, starch, water soluble hydrophilic colloidal carboxyvinyl polymers, such as those sold under the trademark Carbopol 934 and 940 and synthetic inorganic silicated clays such as those sold under the trademark Laponite CP and Laponite SP. These grades of Laponite have the formula $[Si_8Mg_{5.1}Li_{0.6}{}^-H_{7.6}O_{24}]^{0.6-}Na^+0.6$. The solid portion of the vehicle is typically present in an amount up to about 10% by weight of the dentifrice and preferably about 0.5–5% by weight. When employed, grades of Laponite are preferably used in amounts of about 1–5% by weight.

The refractive index of the dentifrice gel vehicle is affected by only a minor degree by the gelling agent, in view of the relatively small amount in which it is typically used and since the refractive indices of the various gelling agents in common dentifrice use are generally close to or within the range in which visually clear dentifrices of the invention are formed.

Organic surface-active agents may be used in the compositions of the present invention to achieve increased prophylactic action, assist in achieving thorough and complete dispersion of the instant compositions throughout the oral cavity, and render the instant compositions more cosmetically acceptable. The organic surface-active material may be anionic, nonionic, ampholytic, or cationic in nature, and it is preferred to employ as the surface-active agent a detersive material which imparts to the composition detersive and foaming properties. Suitable types of such detergents are water-soluble salts of higher fatty acid monoglyceride monosulphonates, such as the sodium salt of the monosulphonated monoglyceride of hydrogenated coconut oil fatty acids, higher alkyl sulphates, such as sodium lauryl sulphate, alkyl aryl sulphonates, such as sodium dodecyl benzene sulphonate, olefin sulphonates, such as sodium olefin sulphonate in which the olefin group contains 12–21 carbon atoms, higher alkyl sulphoacetates, higher fatty acid ester of 1,2 dihydroxy propane sulphonates, and substantially saturated higher aliphatic acyl amides of lower aliphatic amino carboxylic acid compounds, such as those having 12–16 carbons in the fatty acid, alkyl or acyl radicals, and the like. Examples of the last mentioned amides are N-lauroyl sarcosine, and the sodium, potassium, and ethanolamine salts of N-lauroyl, N-myristoyl or N-palmitoyl sarcosine, which should be substantially free from soap or similar higher fatty acid material which tends to substantially reduce the effect of these compounds. The use of these sarcosine compounds in dentifrice compositions of the present invention is particularly advantageous since these materials exhibit a prolonged and marked effect in the inhibition of acid formation in the oral cavity due to carbohydrates breakdown in addition to exerting some reduction in the solubility of tooth enamel in acid solutions. Desirable surface-active effect is obtained with a long chain fatty acid monoglyceride sulponate such as the sodium salt of hydrogenated cold fatty acid monoglyceride sulphonate used alone or in combination with sodium lauryl sulfate.

Other particularly suitable surface-active materials include nonionic agents such as condensates of sorbitan monostearate with approximately 60 moles of ethylene oxide, condensates of ethylene oxide with propylene oxide condensates of propylene glycol ("Pluronics") and amphoteric agents such as quaternized imidazole derivatives, which are available under the trademark "Miranol" such as Miranol C$_2$M. Cationic surface active germicides and antibacterial compounds such as di-isobutylphenoxyethyoxethyl dimethyl benzyl ammonium chloride, benzyl dimethyl stearyl ammonium chloride, tertiary amines having one fatty alkyl group (of from 12–18 carbon atoms) and two (poly) oxyethylene groups attached to the nitrogen (typically containing a total of from about 2 to 50 ethenoxy groups per molecule) and salts thereof with acids, and compounds of the structure

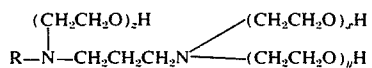

where R is a fatty alkyl group containing from about 12 to 18 carbon atoms, and $x$, $y$ and $z$ total 3 or higher, as well as salts thereof with mineral or organic acids, may also be as used. It is preferred to use from about 0.05 to 5% by weight of the foregoing surface-active materials in the instant oral preparation.

Any suitable flavouring or sweetening materials may be employed in formulating a flavor for the compositions of the present invention. Examples of suitable flavoring constituents include the flavoring oils, e.g., oils of spearmint, peppermint, wintergreen, sassafras, clove, sage, eucalyptus, marjoram, cinnamon, lemon and orange, as well as methylsalicylate. Suitable sweetening agents include sucrose, lactose, maltose, sorbitol, sodium cyclamate, perillartine and saccharine. suitably, flavour and sweetening agents may together comprise from about 0.01 to 5% or more of the composition of the instant invention. Chloroform may also be used.

The compositions of the present invention may also contain a fluorine-containing compound having a beneficial effect on the care and hygiene of the oral cavity, e.g., diminution of enamel solubility in aicd and protection of the teeth against decay which do not substantially detract from the clarity of the dentifrice. Examples of known fluorine materials include sodium fluoride, potassium fluoride, stannous fluoride, stannous chlorofluoride, potassium stannous fluoride (SnF$_2$.KF), and complex fluorides such as sodium fluorozirconate and particularly sodium monofluorophosphate. These materials, which dissociate or release fluorine-containing ions, suitably may be present in an effective but non-toxic amount, usually within the range of about 0.01 to 1% by weight of the water-soluble fluorine content thereof. Sodium fluoride and sodium monofluorophosphate are particularly preferred, as well as mixtures thereof.

Various other materials may be incorporated in the oral preparations of this invention. Examples thereof are colouring or whitening agents or dyestuffs, preservatives, silicones, chlorophyll compounds, ammoniated materials such as urea, diammoniumphosphate and mixtures thereof, and other constituents. The adjuvants are incorporated in the instant compositions in amounts which do not substantially adversely affect the properties and characteristics desired and are selected and used in proper amounts depending upon the particular type of preparation involved. For instance, coloring or whitening agents would reduce clarity of the dentifrice.

Antibacterial agents may also be employed in the oral preparations of the instant invention in an amount of about 0.01–5% by weight. Typical antibacterial agents include N$^1$-(4-chlorobenzyl)-N$^5$-(2,4-dichlorobenzyl) biguanide;
p-chlorophenyl biguanide;
4-chlorobenzhydryl biguanide;
4-chlorobenzhydrylguanylurea;
N-3-lauroxypropyl-N$^5$-p-chlorobenzylbiguanide;
1-(lauryldimethylammonium)-8-(p-chlorobenzyldimethylammonium-) octane dichloride;
5,6-dichloro-a-guanidinobenzimidazole;
N$^1$-p-chlorophenyl-N$^5$-laurylbiguanide;
5-amino-1,3-bis(2-ethylhexyl)-5-methylhexahydro pyrimidine;
and their non-toxic acid addition salts.

Additional dentifrice polishing agents may be used as part of the polishing agent with the alkali metal phosphate, if desired. These include dehydrated silica gel, such as Syloids 63, 72 and 74, available from W. R. Grace and Co. of Baltimore, Md., U.S.A. and synthetic amorphous complex alkali metal or alkaline earth metal aluminosilicate salts. These materials have refractive indices in the range of about 1.44–1.47 and may be combined with alkali metal phosphates to provide up to about 60% of polishing material of desired characteristics in a dentifrice.

Synthetic finely divides silicas such as those sold under the Trademarks Cab-O-Sil M-5, Syloid 244, Sylid 266, Aerosil D200 and mixtures thereof, may also be employed in amounts of about 0.5–20% by weight to promote thickening or gelling and to improve clarity of the dentifrice.

In the manufacture of dentifrices, it is conventional to remove entrained air from the product by de-aeration under vacuum typically at a late stage in the manufacture. In an aspect of the instant invention, it has been observed that in clear dentifrice gels of suitable viscosity, the dispersed, immobile ari bubbles desirably enhance the appearance of the dentifrice, and can, therefore, be permitted to remain. Further, air can be at least partially removed and reintroduced as substantially globular or spheroidal bubbles of say about 0.1–8mm, preferably about 0.5–5mm in size, well distributed in the gel at an average of at least about one per cubic centimeter. Such air bubbles may be placed in the gel by stirring it while introducing air. Instead of air, bubbles of another gas, such as nitrogen or carbon dioxide, can be introduced in non-toxic quantity. In particular, carbon dioxide can provide an effervescent character to the dentifrice.

In the event it is desired to have a minimum amount of air in the dentifrice, or only to have remove a minimum amount of air from the dentifrice of the instant invention, the "Unimix" apparatus described in "Process Engineering" Sept. 11, 1970, pages 81–85. is particularly efficacious for this purpose. In this apparatus a mixing tool can be rotated in clockwise or counter-clockwise manner, and the action of the mixing tool is followed by the action of a scraper blade to ensure that the working surface of the apparatus is scraped clean. Preferably, a plastic such as polytetrafluorethylene is used as the scraper since it is compatible with the various ingredients of the dentifrice. The positioning of the mixing tool and the scraper from a raised central column in the apparatus and the further presence of a hydraulically operated vacuum tight lid permits but little air to enter the formulation during processing. Thus, gelling agent and a portion of liquid including water and/or humectant can be efficiently blended in the Unimix apparatus. Then the remaining liquid can be separately blended with the polishing agent and additional components (except for post-added components, such as flavoring oil) in the Unimix, and then the two dispersions blended together in the Unimix apparatus. If desired, the small amount of air can be largely removed under the depressurized conditions in the apparatus. The apparatus can be used to blend ingredients at room temperature as well as at higher tempratures.

Furthermore, if desired, visible particles of dyes, agglomerated particles of polishinig agents, pearlescent flakes or particles of insoluble salts of antibacterial agents such as the monofluorophosphate salt or the disarcosinate salt of 1,6-di-p-chlorophenyl-biguanidohexane, as well as other particles, can be distributed in the dentifrice.

The dentifrices should have a pH practicable for use. A moderately alkaline pH is preferred.

The following specific examples are further illustrative of the nature of the present invention, although it is understood that the invention is not limited thereto. All amounts are by weight unless otherwise indicated.

EXAMPLE 1

The following visually clear gel dentifrices containing potassium metaphosphate as polishing agen are prepared and deaerated:

| COMPONENTS | Parts A | B | C |
|---|---|---|---|
| Sorbitol (70% solution) | 74.8 | — | 40.61 |
| Glycerine | — | 69.56 | 30.67 |
| Water | — | 5.24 | 4.03 |
| Sodium N-lauroyl sarcosinate pellets | 2.0 | 2.0 | 2.0 |
| Laponite CP | 2.0 | 2.0 | 2.0 |
| Sodium saccharin | 0.1 | 0.1 | 0.1 |
| Colour (1% solution) | 0.15 | 0.15 | 0.15 |
| Flavour | 1.0 | 1.0 | 1.0 |
| Potassium metaphosphate | 20.0 | 20.0 | 20.0 |

The refractive index of the sorbitol-Laponite gel vehicle of Dentifrice A is 1.458; of the glycerine-water-Laponite gel vehicle of Dentifrice is 1.463 and of the sorbitol-glycerine-water-Laponite gel vehicle of Dentifrice C is 1.458.

In the above formulations B and C 9.5 parts of a solution of sodium N-lauroyl sarcosinate may replace the 2.0 parts of sarcosinate pellets. This solution provides 4.6 parts of water and 2.9 parts of glycerine in addition to 2.0 parts of the sarcosinate. Thus, the refractive index of the gel vehicle is kept constant by reducing the amounts of water and glycerine by 4.6 parts and 2.9 parts respectively.

EXAMPLE 2

The following visually clear gel dentifrices containing tribasic sodium orthophosphate dodecahydrate as polishing agent are prepared and deaerated:

| COMPONENTS | Parts D | E |
|---|---|---|
| Sorbitol (70% solution) | 28.0 | 15.7 |
| Glycerine | 43.3 | 55.6 |
| Sodium N-lauroyl sarcosinate pellets | 2.0 | 2.0 |
| Irish moss | 0.5 | 0.5 |
| Silica (Aerosil D200) | 5.0 | 5.0 |
| Sodium saccharin | 0.1 | 0.1 |
| Colour (1% solution) | 0.15 | 0.15 |
| Flavour | 1.0 | 1.0 |
| Tribasic sodium orthophosphate dodecahydrate | 20.0 | 20.0 |

The refractive index of the sorbitol-glycerine-Irish moss-Aerosil D200 gel vehicles of dentifrice D is 1.458 and of Dentifrice E is 1.470. In Dentifrice D, 8.4 parts of water is present from the sorbitol solution. This amount of water, if free, would dissolve 30% of the tribasic sodium orthophosphate dodecahydrate polishing agent at 40°C. However, most of the water is associated with sorbitol is not free to dissolve the polishing agent.

EXAMPLE 3

The following visually clear gel dentifrice containing tetrasodium pyrophosphate decahydrate as polishing agent are prepared and deaerated:

| COMPONENTS | F | G | Parts H | I |
|---|---|---|---|---|
| Sorbitol (70% solution) | — | 71.3 | 43.75 | 30.5 |
| Glycerine | 21.3 | — | 20.0 | — |
| Water | 50.0 | — | — | 40.8 |
| Sodium N-lauroyl sarcosinate pellets | 2.0 | 2.0 | — | 2.0 |
| Sodium N-lauroyl sarcosinate solution | — | — | 9.5 | — |
| Irish moss | 0.5 | 0.5 | 0.5 | 0.5 |
| Silica (Aerosil D200) | 5.0 | 5.0 | 5.0 | 0.1 |

-continued

| COMPONENTS | Parts F | G | H | I |
|---|---|---|---|---|
| Colour (1% solution) | 0.15 | 0.15 | 0.15 | 0.15 |
| Flavour | 1.0 | 1.0 | 1.0 | 1.0 |
| Tetrasodium pyrophosphate decahydrate | 20.0 | 20.0 | 20.0 | 20.0 |

The refractive index of the glycerine-water-Irish moss-Aerosil D200 gel vehicle of Dentifrice F is 1.370; of the sorbitol-Irish moss-Aerosil D200 gel vehicle of Dentifrice G is 1.458; of the sorbitol-glycerine-Irish moss-Aerosil D-200 gel vehicle of Dentifrice H is 1.453; and of the sorbitol-water-Irish moss-Aerosil D200 gel vehicle of Dentifrice I is 1.470.

EXAMPLE 3

The following visually clear gel dentifrices containing any of the hydrated dibasic sodium orthophosphates (i.e., the dihydrate, heptahydrate and dodecahydrate) are prepared and deaerated:

| COMPONENTS | J | Parts K | L |
|---|---|---|---|
| Sorbitol (70% solution) | — | 50.0 | 40.0 |
| Glycerine | 56.3 | 21.3 | 31.25 |
| Water | 15.0 | — | — |
| Sodium N-lauroyl sarcosinate pellets | 2.0 | 2.0 | 2.0 |
| Irish moss | 0.5 | 0.5 | 0.5 |
| Silica (Aerosil D200) | 5.0 | 5.0 | 5.0 |
| Sodium saccharin | 0.1 | 0.1 | 0.1 |
| Colour (1% solution) | 0.15 | 0.15 | 0.15 |
| Flavour | 1.0 | 1.0 | 1.0 |
| Hydrated dibasic sodium orthophosphate | 20.0 | 20.0 | 20.0 |

The refractive index of the glycerine-water-Irish moss-Aerosil D200 gel vehicle of Dentifrice J is 1.444; and of the sorbitol-glycerine-Irish moss-Aerosil D200 gel vehicle of Dentifrices K and L is 1.470 and 1.463 respectively. In Dentifrice J, free water is present in such amount that about 30% of the othophosphate polishing agent would be dissolved at 40°C. In Dentifrice K, the same amount of water is present from the sorbitol solution, but is for the most part not free to dissolve the polishing agent.

It will be apparent to one skilled in the art that various modifications of the above examples may be made thereto.

We claim:

1. A visually clear dentifrice comprising about 5 to 50% by weight of a dentally acceptable water-soluble sodium phosphate salt polishing agent having a refractive index between about 1.435 and about 1.465 and a dentifrice gel vehicle comprising (1) about 20% up to about 80% by weight of said dentifrice of a liquid phase including humectant having a refractive index of about 1.44 to 1.47 said humectant consisting essentially of a member selected from the group consisting of sorbitol, glycerine and mixtures thereof and O up to amount of free water in which not more than about 30% by weight of said polishing agent is soluble at 40°C and (2) about 0.5–10% by weight of a gelling agent, the refractive index of said visually clear dentifrice gel vehicle being between about 1.36 and 1.47, said phosphate salt being homogeneously and invisibly distributed in said dentifrice gel vehicle.

2. The dentifrice claimed in claim 1 wherein said polishing agent is selected from the group consisting of sodium pyrophosphate decahydrate, hydrated dibasic sodium orthophosphate and tribasic sodium orthophosphate dodecahydrate.

3. The dentifrice claimed in claim 2 wherein said polishing agent is dibasic sodium orthophosphate deodecahydrate.

4. The dentifrice claimed in claim 1 wherein said humectant is selected from the group consisting of glycerine, sorbitol, mixture including glycerine and mixture including sorbitol.

5. The dentifrice claimed in claim 1 wherein said gelling agent is a synthetic inorganic silicated clay and is present in amount of about 1–5% by weight.

6. The dentifrice claimed in claim 1 wherein said gelling agent is Irish moss.

7. The dentifrice claimed in claim 1 wherein said phosphate salt is present in amount of about 10–30% by weight.

8. A visually clear dentifrice comprising about 5 to 50% by weight of a dentally acceptable water-soluble alkali metal phosphate salt polishing agent having a refractive index between about 1.435 and about 1.465 selected from the group consisting of (a) sodium pyrophosphate dodecahydrate ($Na_4P_2O_7 \cdot 10H_2O$) -refractive index 1.450; (b) dibasic sodium orthophosphate dihydrate ($Na_2HPO_4 \cdot 2H_2O$)-refractive index 1.463; (c) dibasic sodium orthophosphate heptahydrate ($Na_2HPO_4 \cdot 7H_2O$)-refractive index 1.436; (d) dibasic sodium orthophosphate dodecahydrate ($Na_2HPO_4 \cdot 12H_2O$)-refractive index 1.436; (e) tribasic sodium orthophosphate dodecahydrate ($Na_3PO_4 \cdot 12H_2O$)-refractive index 1.446; and a dentifrice gel vehicle comprising (1) about 20% up to about 80% by weight of said dentifrice of a liquid phase including humectant having a refractive index of about 1.44 to 1.47 said humectant consisting essentially of a member selected from the group consisting of sorbitol, glycerine and mixtures thereof and O up to amount of free water in which not more than about 30% of said polishing agent is soluble at 40°C and (2) about 0.5–10% by weight of a gelling agent, the refractive index of said visually clear dentifrice gel vehicle being between about 1.36 and 1.47, said phosphate salt being homogeneously and invisibly distributed in said dentifrice vehicle.

* * * * *